US012498348B2

United States Patent
Noda et al.

(10) Patent No.: US 12,498,348 B2
(45) Date of Patent: Dec. 16, 2025

(54) ELECTROPHORESIS DEVICE

(71) Applicant: HITACHI HIGH-TECH CORPORATION, Tokyo (JP)

(72) Inventors: Kazuki Noda, Tokyo (JP); Takeshi Ooura, Tokyo (JP); Shunichi Kariya, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 460 days.

(21) Appl. No.: 18/008,461

(22) PCT Filed: Jun. 26, 2020

(86) PCT No.: PCT/JP2020/025378
§ 371 (c)(1),
(2) Date: Dec. 6, 2022

(87) PCT Pub. No.: WO2021/260951
PCT Pub. Date: Dec. 30, 2021

(65) Prior Publication Data
US 2023/0204539 A1 Jun. 29, 2023

(51) Int. Cl.
*G01N 27/447* (2006.01)

(52) U.S. Cl.
CPC . *G01N 27/44704* (2013.01); *G01N 27/44791* (2013.01)

(58) Field of Classification Search
CPC ....... G01N 27/44704; G01N 27/44791; G01N 2030/8804; G01N 35/00584;
(Continued)

(56) References Cited

U.S. PATENT DOCUMENTS 3,819,505 A * 6/1974 Parent .............. G01N 27/44756
422/430
3,932,262 A * 1/1976 Stevens ............ G01N 27/44756
204/641
(Continued)

FOREIGN PATENT DOCUMENTS

CN 105518446 A 4/2016
JP 04-93761 A 3/1992
(Continued)

OTHER PUBLICATIONS

English language translation of the Written Opinion for International application No. PCT/JP2020/025378, whic was mailed on Sep. 24, 2020 (Year: 2020).*

(Continued)

*Primary Examiner* — Alexander S Noguerola
(74) *Attorney, Agent, or Firm* — MATTINGLY & MALUR, PC

(57) ABSTRACT

An electrophoresis device of the present disclosure includes: a capillary filled with a phoresis medium; a buffer container accommodating a buffer solution; a storage portion storing a sample container accommodating a sample; at least one autosampler transporting each of the sample container and the buffer container; and a control unit controlling driving of the autosampler, in which the control unit drives the autosampler such that, while the buffer container is disposed at a capillary position where one end portion of the capillary is positioned, the sample container is transported from the storage portion to a standby position near the capillary position, and, when the buffer container has been transported from the capillary position to the standby position, the sample container is transported from the standby position to the capillary position.

12 Claims, 13 Drawing Sheets

(58) Field of Classification Search
CPC ............ G01N 35/0092; G01N 35/025; G01N 2035/0462; G01N 2035/0465; G01N 2035/0498
See application file for complete search history.

(56) References Cited

U.S. PATENT DOCUMENTS

| | | |
|---|---|---|
| 6,027,627 A | 2/2000 | Li et al. |
| 2003/0221965 A1 | 12/2003 | Seino et al. |
| 2006/0006066 A1 | 1/2006 | Yamazaki et al. |
| 2006/0263248 A1 | 11/2006 | Gomm et al. |
| 2013/0292250 A1 | 11/2013 | Boeke et al. |
| 2016/0216235 A1 | 7/2016 | Miyata et al. |

FOREIGN PATENT DOCUMENTS

| | | |
|---|---|---|
| JP | 05-164737 A | 6/1993 |
| JP | 11-166914 A | 6/1999 |
| JP | 2003-524747 A | 8/2003 |
| JP | 2003344357 A | 12/2003 |
| JP | 2006029814 A | 2/2006 |
| JP | 4377764 B2 | 12/2009 |
| JP | 2012-132925 W | 7/2012 |
| JP | 2019035753 A | 3/2019 |

OTHER PUBLICATIONS

JPO translation of JP 05-164737A, patent published on Jun. 29, 1993 (Year: 1993).*
English language translation of the Chinese Office Action received in corresponding Chinese Application No. 202080102023.7 dated Dec. 31, 2024 (Year: 2024).*
Chinese Office Action received in corresponding Chinese Application No. 202080102023.7 dated Dec. 31, 2024.
International Search Report of PCT/JP2020/025378 Sep. 24, 2020.
Japanese Office Action received in corresponding Japanese Application No. 2023-185154 dated May 7, 2024.

* cited by examiner

A ARROW VIEW

ELECTROPHORESIS DEVICE

TECHNICAL FIELD

The present disclosure relates to an electrophoresis device.

BACKGROUND ART

Capillary electrophoresis is widely used as a technique for separating and analyzing biological samples such as deoxyribonucleic acid (DNA). In general, a capillary electrophoresis device is equipped with, for example, a holder storing a sample and a stage transporting the sample to a capillary.

JP-A-2019-35753 (PTL 1) is to "provide a multiplex capillary electrophoresis system and a console based on ultraviolet absorbance improved in terms of sample handling and control method for sample analysis". According to the technique disclosed in PTL 1, "An x-z stage moves a sample from a user-accessible drawer to a capillary array for analysis. Using a computer program, a user can add a capillary electrophoresis job corresponding to sample row or plate analysis to a queue without stopping or interrupting the processing in the process of execution" (see the abstract of PTL 1).

JP-B-4377764 (PTL 2) is to "prevent sample deterioration and efficiently perform analysis in an electrophoresis device". According to the technique disclosed in PTL 2, "An electrophoresis analysis unit analyzing a sample accommodated in a sample plate by electrophoresis, a frozen storage tank where a plurality of sample plates can be loaded, a standby device temporarily storing a sample plate in the frozen storage tank before transport to the electrophoresis analysis unit, and a transport device transporting the sample plate are provided, in which another sample plate is stored in the standby device while the sample plate is analyzed in the electrophoresis analysis unit" (see the abstract and claim 1 of PTL 2).

CITATION LIST

Patent Literature

PTL 1: JP-A-2019-35753
PTL 2: JP-B-4377764

SUMMARY OF INVENTION

Technical Problem

However, although both the electrophoresis device described in PTL 1 and the electrophoresis device described in PTL 2 have the function of replacing an unnecessary sample or changing the order of sample processing during electrophoresis, each is provided with one transport stage, and thus the transport system requires a long transport time and the processing of the entire device is time-consuming.

In this regard, the present disclosure provides a technique with which sample container replacement can be performed during electrophoresis and the electrophoresis processing can be expedited in an electrophoresis device.

Solution to Problem

In order to solve the above problems, an electrophoresis device of the present disclosure includes: a capillary filled with a phoresis medium; a buffer container accommodating a buffer solution; a storage portion storing a sample container accommodating a sample; at least one autosampler transporting each of the sample container and the buffer container; and a control unit controlling driving of the autosampler, in which the control unit drives the autosampler such that, while the buffer container is disposed at a capillary position where one end portion of the capillary is positioned, the sample container is transported from the storage portion to a standby position near the capillary position, and, when the buffer container has been transported from the capillary position to the standby position, the sample container is transported from the standby position to the capillary position.

Further features related to the present disclosure will become apparent from the description of the specification and the accompanying drawings. In addition, the aspects of the present disclosure will be achieved and realized by means of the elements, combinations of various elements, and aspects of the following detailed description and the claims.

The description herein is merely exemplary and is not intended to limit the scope of the claims or application examples of the present disclosure in any manner.

Advantageous Effects of Invention

According to the technique of the present disclosure, sample container replacement can be performed during electrophoresis, and electrophoresis processing can be expedited. Problems, configurations, and effects other than the above will be clarified by the following description of the embodiments.

DESCRIPTION OF EMBODIMENTS

To paraphrase the features of the electrophoresis device of the present disclosure, it can be said that the electrophoresis device of the present disclosure is characterized by having at least one autosampler that replaces the transport stage of the related art and further having another configuration effective for expediting transport by a transport system. Anticipated from this feature is the effect of shortening the processing time of the entire device by expediting the transport by the transport system.

It is conceivable that the above "another configuration" is broadly divided into the following three configurations: (I) a configuration having another part that replaces the transport stage of the related art; (II) a configuration further having an information reading unit reading information on a sample marked on a sample container and a sample container transport control system related thereto; and (III) a configuration related to the combination of the above (I) and (II).

It can be said that the above configuration (I) is characterized by having two mutually separated parts as the part that replaces the transport stage of the related art. It suffices that at least one of the two mutually separated transport stage parts is movable, and thus conceivable are the two aspects of: (1) both being movable; and (2) one of the two being fixed and the other being movable. Both (1) and (2) belong to the scope of the present disclosure. Hereinafter, the above (1) will be regarded as "first embodiment", the above (2) will be regarded as "second embodiment", and each embodiment will be described in detail with reference to the drawings. In particular, in "first embodiment", the two movable transport stage parts of the above (1) will be described as "sample autosampler" and "buffer autosampler", respectively. In addition, in "second embodiment", the fixed and movable transport stage parts of the above (2) will be described as "fixed portion" and "autosampler", respectively.

The configurations of the above (II) and (III) will be described together in the description of "first embodiment" as modification examples of "first embodiment".

First Embodiment

Configuration Example of Electrophoresis Device

Figure 1:
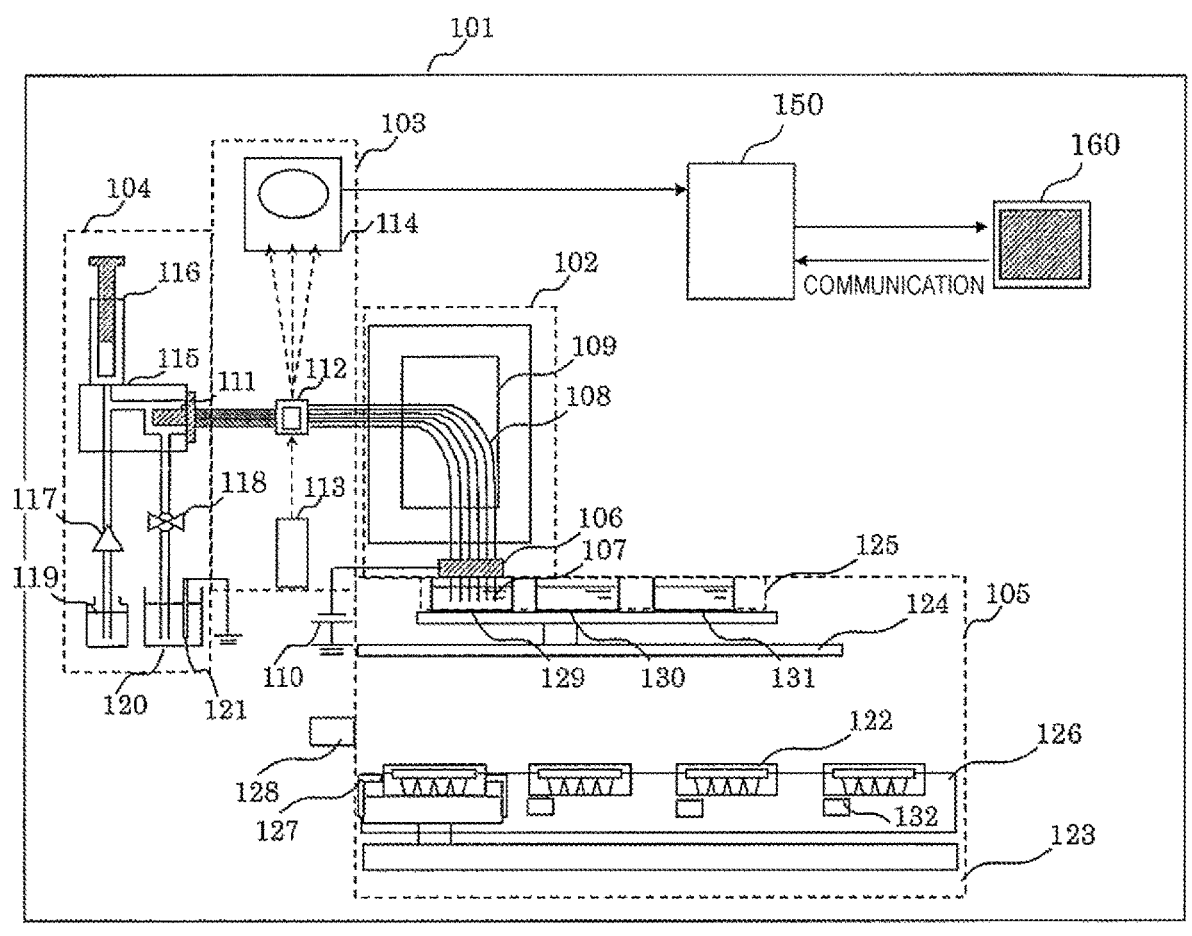
FIG. 1 is a schematic diagram of an electrophoresis device according to a first embodiment.

FIG. 1 is a schematic diagram of an electrophoresis device 101 according to the first embodiment. The electrophoresis device 101 includes a capillary electrophoresis portion 102, an irradiation detection unit 103, a pump mechanism 104, an autosampler mechanism 105, a signal processing unit 150, and a control unit 160.

The capillary electrophoresis portion 102 has a load header 106, a cathode electrode 107, a capillary array 108, a barcode reader 128, a constant temperature bath 109, and a high-voltage power supply 110.

The capillary array 108 is configured by a plurality of capillaries, the load header 106 is fixed on the cathode side, and a capillary head 111 is fixed on the anode side. The capillary is, for example, a glass tube with several tens of micrometers in inner diameter and several hundred micrometers in outer shape. The outer skin of the capillary is coated with polyimide resin. However, at a detection unit 112 of the irradiation detection unit 103, the coating is removed such that the luminescence in the capillary leaks out.

The load header 106 is fixed to the constant temperature bath 109 and provided with the cathode electrode 107. Each capillary passes through the cathode electrode 107 and protrudes from the tip of the cathode electrode 107. The high-voltage power supply 110 is connected to the cathode electrode 107 and applies a voltage to the cathode electrode 107.

The constant temperature bath 109 keeps the temperature of the capillary array 108 constant during phoresis.

The irradiation detection unit 103 optically detects a sample (for example, a biological sample) separated by an electrophoresis medium. The irradiation detection unit 103 has the detection unit 112, a light source 113, and an optical detector 114. The detection unit 112 is a part reading optical information on the sample that flows in the capillary. Liquid, gas, and semiconductor lasers, and the like can be appropriately used as the light source 113, which can be replaced with an LED. By the detection unit 112 being irradiated with excitation light from the light source 113, light with a sample-dependent wavelength is emitted, and the emitted light is detected by the optical detector 114. The optical detector 114 has a light sensor such as a CCD sensor and a photodiode and outputs a light detection signal to the signal processing unit 150. The signal processing unit 150 has an analog/digital conversion circuit (not illustrated). Upon receiving the detection signal from the optical detector 114, the signal processing unit 150 converts the detection signal into a digital signal with the analog/digital conversion circuit and outputs the digital signal to the control unit 160.

The pump mechanism 104 injects an electrophoresis medium into the capillary and an energization path. The pump mechanism 104 has the capillary head 111, a block 115, a pump 116, a check valve 117, a pin valve 118, a polymer container 119, a buffer container 120, and an anode electrode 121.

The capillary head 111 bundles the plurality of capillaries into one and has a protrusion for insertion into the block 115. The polymer container 119 accommodates a polymer that serves as an electrophoresis medium. A polyacrylamide-based separation gel or the like can be used as the polymer. By driving the pump 116, the flow path in the block 115 is filled with the polymer and this polymer is injected into the capillary. The buffer container 120 accommodates a buffer solution for phoresis, and the anode electrode 121 is immersed in this buffer solution.

The autosampler mechanism 105 has a sample autosampler 123, a buffer autosampler 124, and a storage portion 126.

Each of the sample autosampler 123 and the buffer autosampler 124 has a moving stage, three stepping motors for moving the moving stage in three axial directions, and a linear guide. A sample container 122 is placed on the moving stage of the sample autosampler 123, and the sample container 122 is transported by moving the moving stage in the three axial directions. The moving stage of the sample autosampler 123 has an electric gripper 127 gripping the sample container 122. The sample container 122 is fixed on the moving stage by the electric gripper 127. The sample container 122 can be, for example, a well plate having a plurality of wells. Although not illustrated, the outer wall of the sample container 122 is marked with a barcode indicating information on the sample (sample information) that is accommodated in the sample container 122.

A reagent container 125 is placed on the moving stage of the buffer autosampler 124, and the reagent container 125 is transported by moving the moving stage in the three axial directions. The reagent container 125 includes a buffer container 129 accommodating a buffer solution for phoresis, a washing tank 130 accommodating a capillary washing liquid, and a waste liquid tank 131 where an excess solution is discarded, which are placed on the same moving stage. Although not illustrated, the buffer autosampler 124 can also be provided with the electric gripper 127.

In this specification, the position of the sample container 122 and the reagent container 125 at which the cathode end of the capillary array 108 (cathode electrode 107) is positioned in the sample container 122 or the reagent container 125 directly below the load header 106 may be referred to as "capillary position". FIG. 1 illustrates a state where the buffer container 129 is positioned at the capillary position and the cathode electrode 107 is immersed in the buffer solution. Each of the sample autosampler 123 and the buffer autosampler 124 is capable of moving the sample container 122, the buffer container 129, the washing tank 130, or the waste liquid tank 131 to the capillary position by moving the moving stage.

The storage portion 126 is a place where the sample container 122 is stored in the electrophoresis device 101 and is, for example, disposed below the capillary position. The storage portion 126 is, for example, a drawer and can be pulled out of the electrophoresis device 101 in a substantially horizontal direction. A user can access the storage portion 126 from the outside of the electrophoresis device 101 and put in and take out the sample container 122. Although the storage portion 126 holds only the sample container 122 in the example illustrated in FIG. 1, the storage portion 126 may hold both the sample container 122 and the reagent container 125. The storage portion 126 is provided with a reflective photointerrupter 132 (sensor) detecting that the sample container 122 has been disposed.

The barcode reader 128 (information reading unit) reads the barcode marked on the sample container 122 transported from the storage portion 126 to the reading position by the sample autosampler 123 and outputs a read signal to the control unit 160. The control unit 160 acquires sample information by processing the signal from the barcode reader 128. It should be noted that how to read the sample information is not limited to the use of the barcode and RFID, a QR code (registered trademark), and the like can also be used. In addition, a sample information-indicating character may be attached to the sample container 122 and a camera may be provided instead of the barcode reader 128 to take an image of the sample container 122, and the control unit 160 may acquire sample information from the image data.

The control unit 160 is a computer device such as a personal computer, a smartphone, and a tablet terminal and controls each part of the electrophoresis device 101. In addition, the control unit 160 processes, with a processor or the like, the light detection signal (digital signal) from the signal processing unit 150 and the read signal from the barcode reader 128 as described above. It suffices that the control unit 160 is capable of communicating with each part of the electrophoresis device 101, and connection to each part of the electrophoresis device 101 may be wired or wireless. Although not illustrated, the control unit 160 has an input device with which a user can input instructions and electrophoresis conditions and a display device that displays a GUI screen and analysis results.

Figure 2:
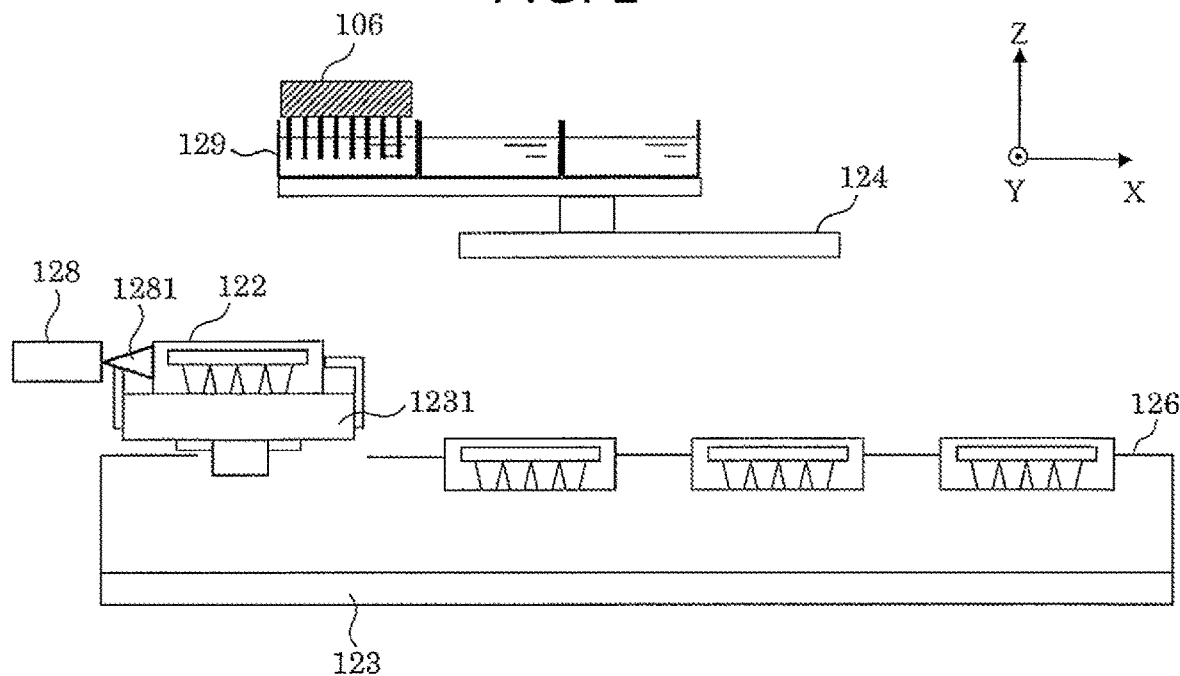
FIG. 2 is a schematic diagram illustrating a state where a sample container has been transported to a reading position of a barcode reader.

FIG. 2 is a schematic diagram illustrating a state where the sample container 122 has been transported to the reading position of the barcode reader 128. As illustrated in FIG. 2, the sample autosampler 123 picks up one sample container 122 from the storage portion 126, places it on a moving stage 1231, drives the moving stage 1231, and transports the sample container 122 to the reading position of the barcode reader 128. It should be noted that in this specification, the "reading position" of the barcode reader 128 is where light 1281 emitted from the barcode reader 128 is incident, the reflected light from the barcode on the sample container 122 is incident on the barcode reader 128, and the sample information can be read without problems.

As illustrated in FIG. 2, by the barcode reader 128 being incorporated in the electrophoresis device 101 and the reading position being above the storage portion 126, the sample container 122 picked up from the storage portion 126 by the sample autosampler 123 can be transported to the reading position as it is and the sample information can be read.

It should be noted that although the barcode reader 128 (information reading unit) and the configuration related thereto have been described in the present embodiment having the two autosamplers of the sample autosampler 123 and the buffer autosampler 124, the barcode reader 128 (information reading unit) and the configuration related thereto in the present disclosure are also effective in a configuration that has the sample autosampler 123 as an autosampler and does not have the buffer autosampler 124. In other words, also within the scope of the present disclosure is an electrophoresis device characterized by including a capillary filled with a phoresis medium, a storage portion storing a sample container accommodating a sample, an autosampler transporting the sample container, an information reading unit reading information on the sample marked on the sample container, and a control unit controlling the driving of the autosampler and driving the autosampler so as to transport the sample container from the storage portion to the reading position of the information reading unit. According to this configuration, the effect of shortening the processing time of the entire device by expediting the transport by the transport system is anticipated even in a configuration that has the sample autosampler 123 as an autosampler and does not have the buffer autosampler 124 in particular.

Figure 3:
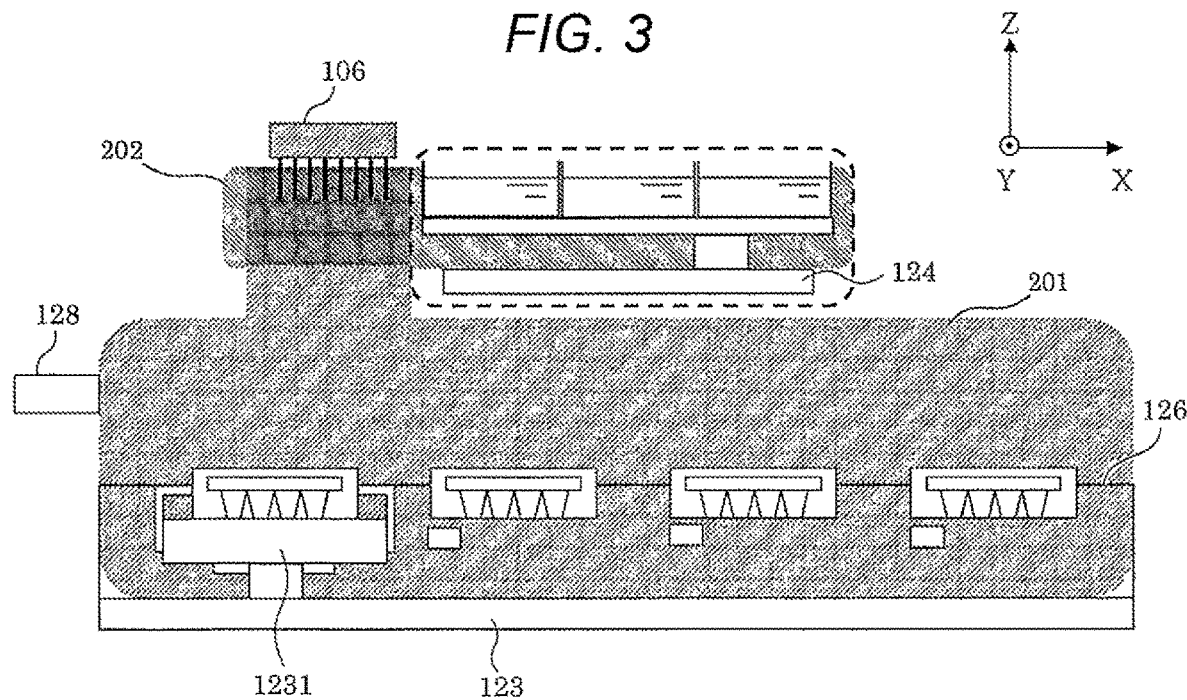
FIG. 3 is a schematic diagram illustrating a drive region of an autosampler.

FIG. 3 is a schematic diagram illustrating the drive region of the autosampler mechanism 105. As illustrated in FIG. 3, a drive region 201 of the sample autosampler 123 and a drive region 202 of the buffer autosampler 124 are independent except for the position where the cathode end of the capillary is inserted into each container and do not interfere with each other. As a result, contact and collision between the sample autosampler 123 and the buffer autosampler 124 can be prevented.

Figure 4A:
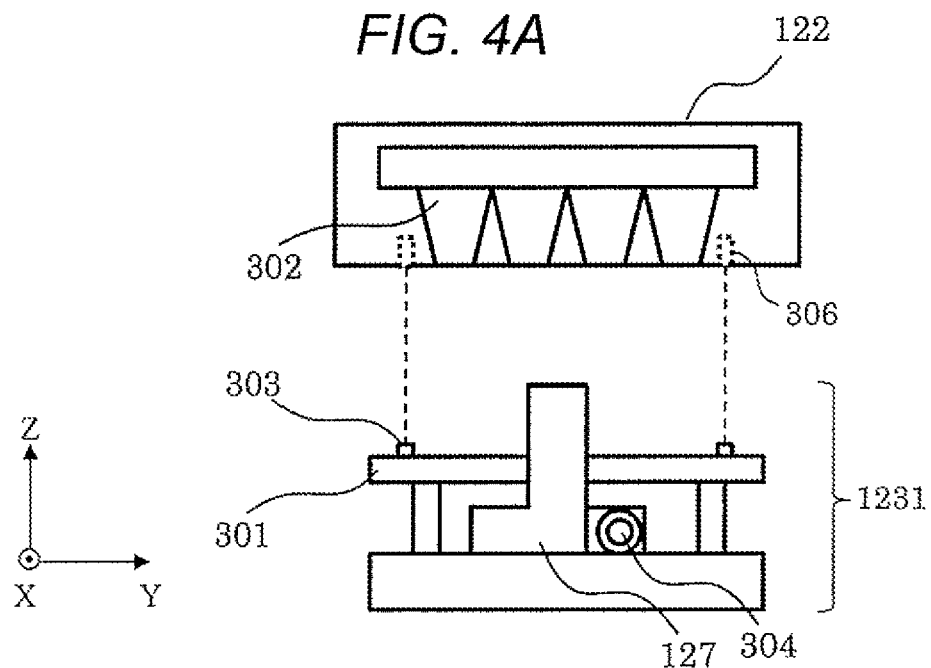
FIG. 4A is a side view of a moving stage of a sample autosampler.
Figure 4B:
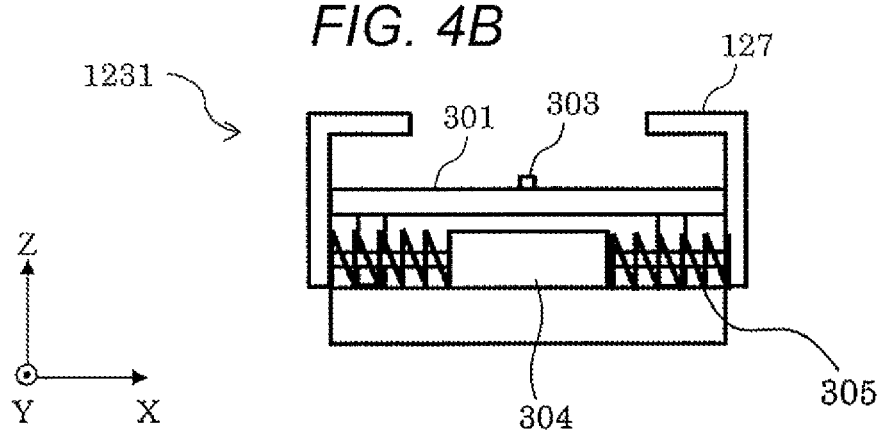
FIG. 4B is a front view of the moving stage of the sample autosampler.

FIG. 4A is a side view of the moving stage 1231 of the sample autosampler 123, and FIG. 4B is a front view of the moving stage 1231 of the sample autosampler 123. The moving stage 1231 of the sample autosampler 123 has the electric gripper 127, a stage 301, a positioning pin 303, a solenoid 304, and a spring 305. The sample container 122 is illustrated in FIG. 4A, and the bottom surface of the sample container 122 is provided with a positioning hole 306 into which the positioning pin 303 is fitted. Although two pairs of positioning pins 303 and positioning holes 306 are provided in FIG. 4A, the number is not limited thereto.

By providing the positioning pin 303 and the positioning hole 306, fixing at a fixed position is possible each time the sample container 122 is fixed on the stage 301. As a result, the capillary can be reliably inserted into a sample-accommodating well 302.

The solenoid 304 controls the opening-closing operation of the electric gripper 127. When a current flows through the solenoid 304, the solenoid 304 is driven and the electric gripper 127 is opened. When the current flowing through the solenoid 304 is stopped, the electric gripper 127 is closed by the elastic force of the spring 305. When the sample container 122 is placed on the stage 301, the electric gripper 127 is opened. After the sample container 122 is placed on the stage 301, the sample container 122 can be gripped by closing the electric gripper 127.

Figure 5A:
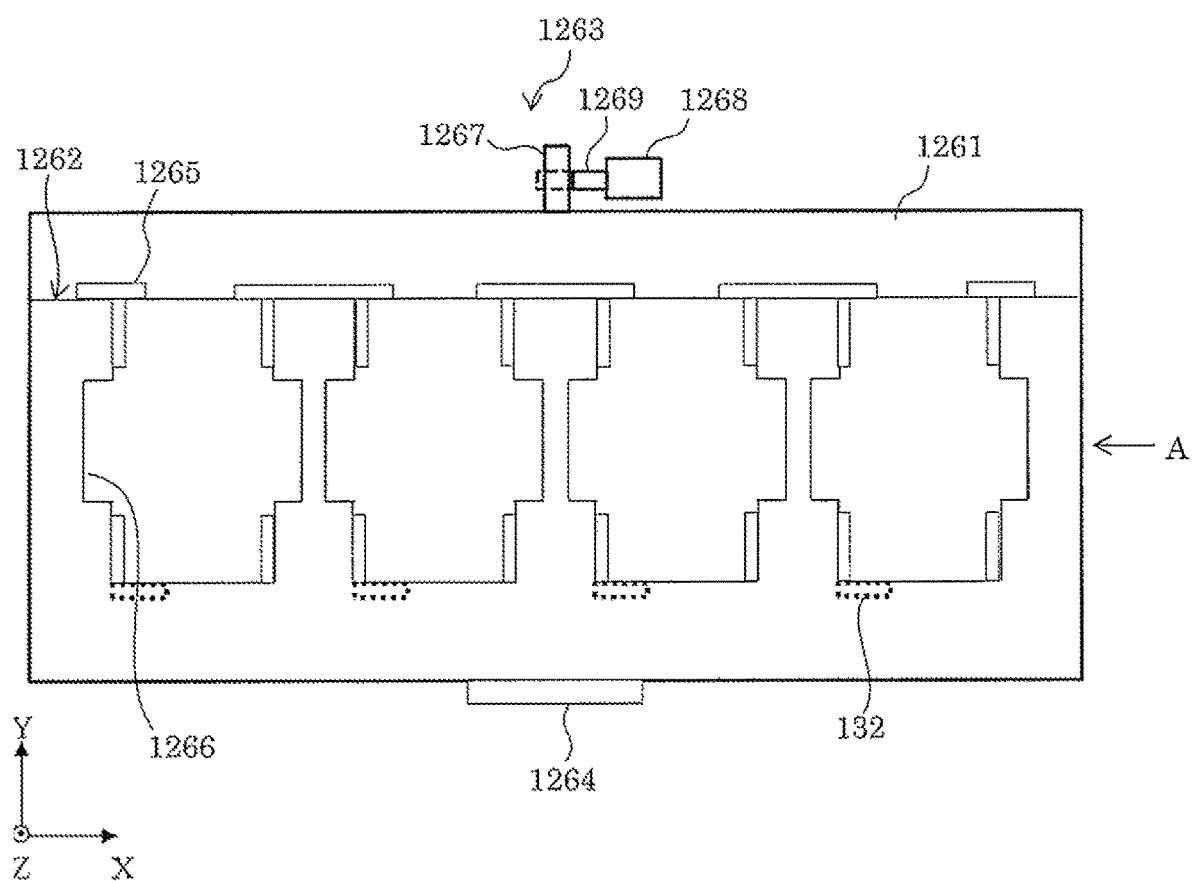
FIG. 5A is a top view of a storage portion.
Figure 5B:
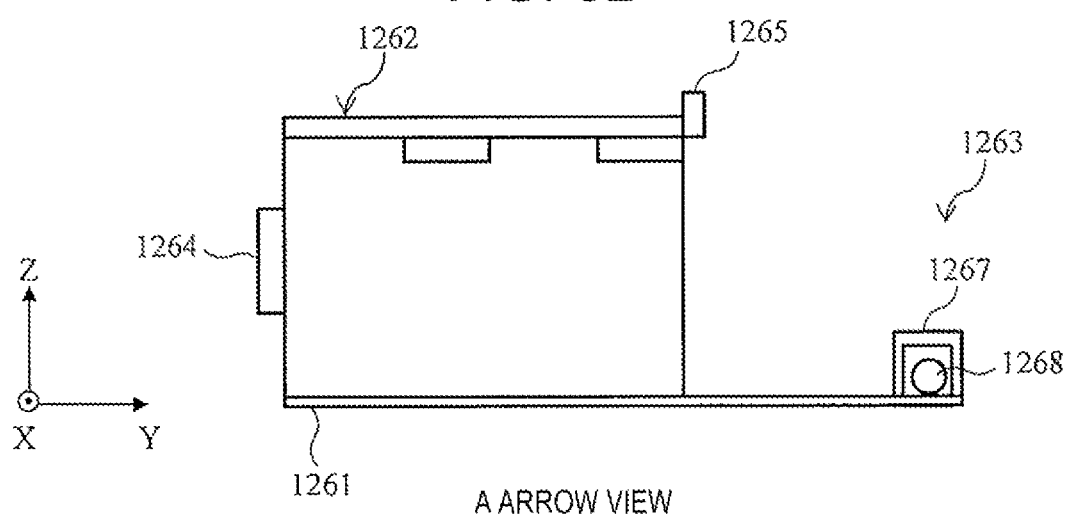
FIG. 5B is a view in the direction of an arrow A in FIG. 5A, which is a side view of the storage portion.

FIG. 5A is a top view of the storage portion 126. FIG. 5B is a side view of the storage portion 126, which is a view in the direction of the arrow A in FIG. 5A. As illustrated in FIGS. 5A and 5B, the storage portion 126 has a base 1261, a storage section 1262, and an interlock mechanism 1263.

The storage section is provided with a handle 1264 for a user to open and close the storage portion 126. Using the handle 1264, the user can pull the storage portion 126 out of the electrophoresis device 101 and return the storage portion 126. In this manner, the storage portion 126 has a shape facilitating user access.

Although disposition places for four sample containers 122 are in the storage section 1262 in the example of FIG. 5A, the number of storages of the sample container 122 is not limited to four. The reflective photointerrupter 132 is provided at each disposition place of the sample container 122. The reflective photointerrupter 132 detects that the sample container 122 has been disposed and non-detects in a case where the sample container 122 is absent. A detection signal from the reflective photointerrupter 132 is output to the control unit 160. As a result, it is possible to confirm where the sample container 122 is disposed on the storage portion 126.

A support 1265 for fixing the position of the sample container 122 is provided at each disposition place of the sample container 122. Further, each disposition place of the sample container 122 is provided with a recess 1266 of non-contact with a part of the side surface of the sample container 122. This recess 1266 serves as a passage when the electric gripper 127 is open.

The interlock mechanism 1263 has a sheet metal 1267 and a solenoid 1268. The sheet metal 1267 is provided with an opening portion, and the solenoid 1268 has a rod-shaped member 1269 that can be inserted into the opening portion of the sheet metal 1267. When a current flows through the solenoid 1268, the rod-shaped member 1269 is inserted into the opening portion of the sheet metal 1267 to result in a locked state (dotted line in FIG. 5A). When the current flowing through the solenoid 1268 is turned off, the rod-shaped member 1269 is withdrawn from the opening portion of the sheet metal 1267 to result in an unlocked state (solid line in FIG. 5A). The current application to the solenoid 1268 is controlled by the control unit 160.

The interlock mechanism 1263 locks and prevents user access in a case where the sample autosampler 123 is not at a predetermined position. The sample autosampler 123 is at the predetermined position except during the electrophoresis sample injection and sample information reading to be described later. Accordingly, at timings other than during these two types of processing, the interlock mechanism 1263 is unlocked such that a user can access the sample. The "predetermined position" of the sample autosampler 123 is, for example, the initial position at the start of the electrophoresis device 101 and can be near the capillary position. Transport can be expedited by installing the storage portion 126 near the capillary position. In addition, the electrophoresis device 101 can be reduced in size by disposing the storage portion 126 above the linear guide of the sample autosampler 123.

<Operation of Electrophoresis Device>

Figure 6:
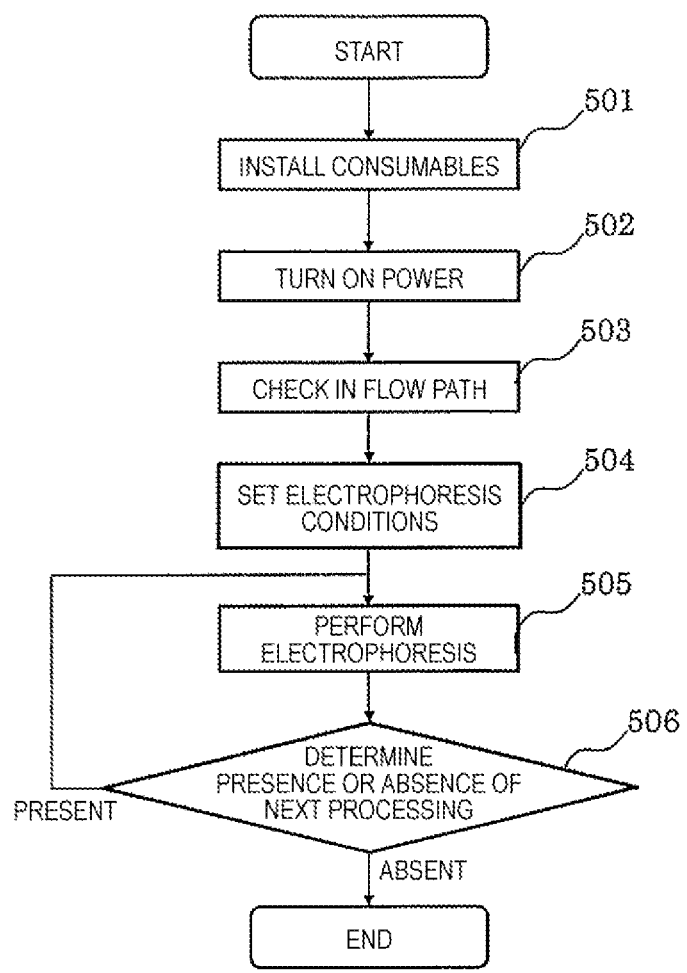
FIG. 6 is a flowchart illustrating a series of operations in the electrophoresis device.

FIG. 6 is a flowchart illustrating a series of operations in the electrophoresis device 101.

(Step 501)

A user installs the capillary array 108, the polymer container 119 accommodating a polymer, the buffer container 120 accommodating a buffer solution on the anode side, the buffer container 129 accommodating a buffer solution on the cathode side, and the sample container 122 accommodating a sample at predetermined positions in the electrophoresis device 101. In putting the buffer solution into the container, it is necessary to put the solution to the extent of electrode immersion. In addition, on the anode side, the tip of the tube extending from the block 115 is also immersed in the buffer solution in the buffer container 120. This is because electrophoresis in a state where the electrode and the tube are not immersed in the buffer solution may lead to discharge. In addition, by making the water levels of the buffer solutions on both the anode side and the cathode side the same, it is possible to prevent the occurrence of a difference in pressure attributable to a difference in height.

(Step 502)

The user turns on the power of the electrophoresis device 101. Upon receiving a signal indicating that the power of the electrophoresis device 101 has been turned on, the control unit 160 drives the pump mechanism 104 to fill the capillary with the polymer.

(Step 503)

The user confirms whether the energization path for electrophoresis is in a normal state. Specifically, the user confirms whether the energization path is filled with the polymer and whether foreign matter such as air bubbles is mixed in. In replacing the capillary array 108 or the polymer container 119, the inside of the flow path is refilled with the polymer using the pump mechanism 104 or manually by the user using a syringe or the like, and then the user visually confirms an abnormality in the flow path such as air bubble mixing. However, minute foreign matter and air bubbles are difficult to visually confirm and may be overlooked. When electrophoresis is performed with foreign matter mixed in, the foreign matter acts as a resistance and there is a risk that normal measurement cannot be performed during the electrophoresis or discharge occurs. In a case where there is foreign matter mixed in, the control unit 160 removes the foreign matter from the energization path by any method such as buffer solution flowing through the capillary.

(Step 504)

The user uses the input device of the control unit 160 to set conditions used for electrophoresis.

(Step 505)

The user inputs an electrophoresis operation start instruction. Upon receiving the electrophoresis start instruction, the control unit 160 executes the electrophoresis operation.

(Step 506)

When the electrophoresis of one sample or each sample in one sample container 122 is completed, the control unit 160 determines the presence or absence of another sample to be processed next. In the case of presence, the process returns to step 505 and the electrophoresis operation is performed. The operation ends in the case of absence.

<Electrophoresis Method>

Figure 7:
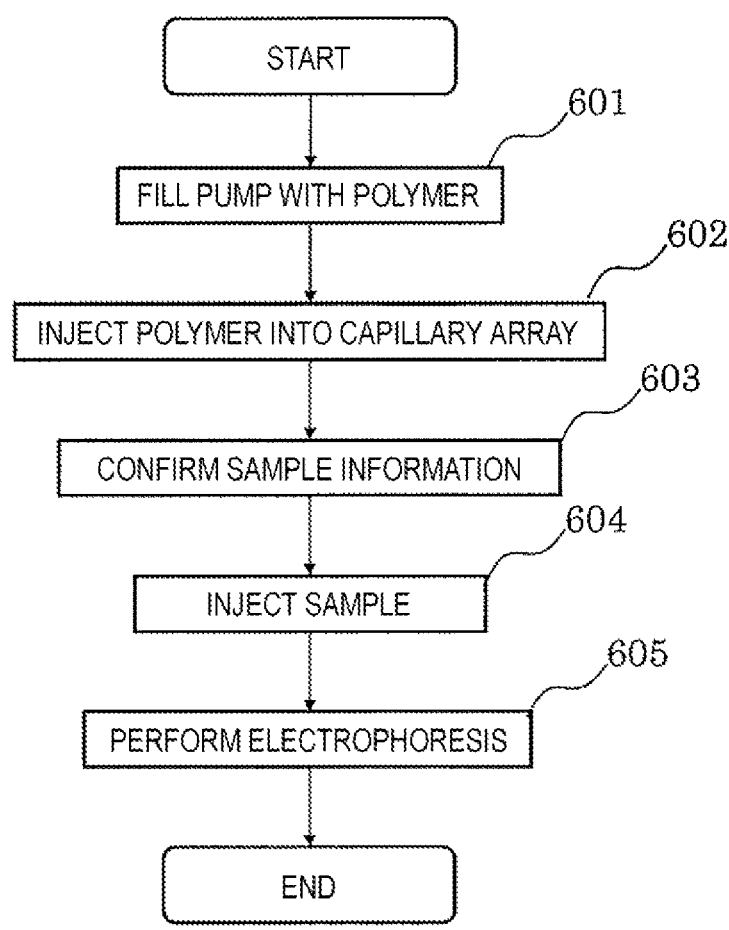
FIG. 7 is a flowchart outlining an electrophoresis operation.

FIG. 7 is a flowchart outlining the electrophoresis operation in step 505 described above.

(Step 601)

The control unit 160 drives the pump 116 to fill the block 115 with the polymer.

(Step 602)

The control unit 160 closes the pin valve 118 and drives the pump 116 to inject the polymer into the capillary array 108.

(Step 603)

The control unit 160 drives the sample autosampler 123 to place one of the sample containers 122 stored in the storage portion 126 on the moving stage 1231 and move it to the reading position of the barcode reader 128. The control unit 160 receives the read signal from the barcode reader 128 and reads the sample information.

(Step 604)

The control unit 160 drives the buffer autosampler 124 to withdraw the buffer container 129 from the capillary position. Next, the control unit 160 drives the sample autosampler 123 to transport the sample container 122 to the capillary position and immerse the cathode end of the capillary array 108 in the sample in the sample container 122. The control unit 160 drives the high-voltage power supply 110 to inject the sample into the capillary array 108 by voltage application between the cathode electrode 107 and the anode electrode 121.

(Step 605)

The control unit 160 drives the sample autosampler 123 to return the sample container 122 onto the storage portion 126 and drives the buffer autosampler 124 to transport the buffer container 129 to the capillary position and immerse the cathode end of the capillary array 108 in the buffer solution in the buffer container 129. After that, the control unit 160 drives the high-voltage power supply 110 to perform electrophoresis by voltage application between the cathode electrode 107 and the anode electrode 121.

During this electrophoresis, the buffer autosampler 124 fixes the buffer container 129 at the capillary position, but the sample autosampler 123 can be driven. In addition, during the electrophoresis, the interlock mechanism 1263 of the storage portion 126 can be unlocked. Accordingly, the user can open the storage portion 126 during the electrophoresis to replace the sample container 122 with a new sample container 122 and read the sample information with the barcode reader 128 by driving the sample autosampler 123.

<Operation of Autosampler>

Of the above electrophoresis operations (FIG. 7), the transport operation of the sample container 122 and the buffer container 129 by the autosampler mechanism 105 will be described in detail. The transport operation is broadly divided mainly into (1) sample information reading and (2) replacement of the sample container and the buffer container to the capillary position in injecting the sample. The (1) sample information reading is an operation at the sample autosampler 123, and the (2) replacement of the sample container and the buffer container to the capillary position is an operation between the sample autosampler 123 and the buffer autosampler 124.

Here, before describing the transport operation by the two drive systems of the sample autosampler 123 and the buffer autosampler 124, the operation in a case where the sample container 122 and the buffer container 129 are transported using one autosampler instead of using the sample autosampler 123 and the buffer autosampler 124 will be described first. In the configuration of the autosampler of the electrophoresis device in this case, only one autosampler is provided instead of the sample autosampler 123 and the buffer autosampler 124 in FIG. 1 and the sample container 122 or the reagent container 125 is placed on the moving stage of the autosampler.

Figure 8:
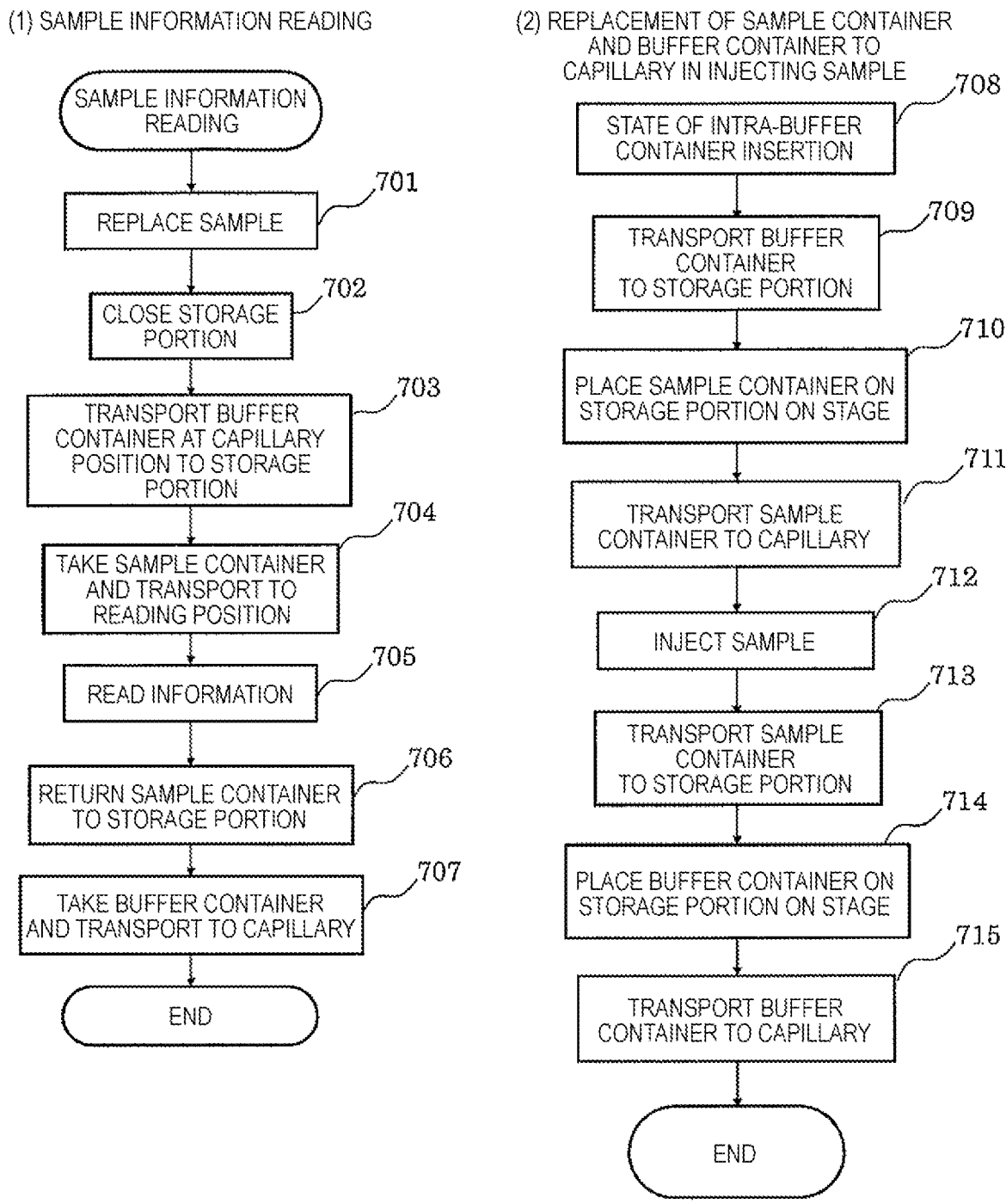
FIG. 8 is a flowchart illustrating a sample container and buffer container transport operation in the case of a single drive system.

FIG. 8 is a flowchart illustrating the transport operation of the sample container 122 and the buffer container 129 in the case of a single autosampler. The left drawing of FIG. 8 (steps 701 to 707) illustrates the operation in reading the sample information.

(Step 701)

The user replaces the sample container 122 in the storage portion 126.

(Step 702)

The user closes the storage portion 126 after disposing the sample container 122 in the storage portion 126. At this time, the reflective photointerrupter 132 of the storage portion 126 detects that the sample container 122 has been disposed and outputs a detection signal to the control unit 160.

(Step 703)

The control unit 160 identifies the disposition place where the sample container 122 is disposed from the detection signal of the reflective photointerrupter 132 and reads information on the sample container 122 at the disposition place. Specifically, the control unit 160 drives the autosampler to transport the buffer container 129 at the capillary position onto the storage portion 126.

(Step 704)

The control unit 160 drives the autosampler to place the sample container 122 at the above disposition place on the moving stage and transport it to the reading position of the barcode reader 128.

(Step 705)

The control unit 160 receives the read signal from the barcode reader 128 and reads the sample information.

(Step 706)

The control unit 160 drives the autosampler to return the sample container 122 from the reading position of the barcode reader 128 onto the storage portion 126.

(Step 707)

The control unit 160 drives the autosampler to transport the buffer container 129 from the storage portion 126 to the capillary position and immerse the cathode end of the capillary array 108 in the buffer solution.

The right drawing of FIG. 8 (steps 708 to 715) illustrates the operation in injecting the sample.

(Step 708)

In this step, the buffer container 129 on the autosampler is at the capillary position, and the cathode end of the capillary array 108 is inserted into the buffer container 129.

(Step 709)

The control unit 160 drives the autosampler to transport the buffer container 129 onto the storage portion 126.

(Step 710)

The control unit 160 drives the autosampler to place the sample container 122 at the designated storage portion 126 position on the moving stage of the autosampler.

(Step 711)

The control unit 160 drives the autosampler to transport the sample container 122 to the capillary position and immerse the cathode end of the capillary array 108 in the sample.

(Step 712)

The control unit 160 drives the high-voltage power supply 110 to inject the sample into the capillary array 108 by voltage application between the cathode electrode 107 and the anode electrode 121.

(Step 713)

After the sample injection is completed, the control unit 160 drives the autosampler to return the sample container 122 from the capillary position onto the storage portion 126.

(Step 714)

The control unit 160 drives the autosampler to place the buffer container 129 again on the moving stage of the autosampler.

(Step 715)

The control unit 160 drives the autosampler to transport the buffer container 129 to the capillary position and immerse the cathode end of the capillary array 108 in the buffer solution.

In the example described above, the buffer container is returned to the capillary position (step 707) and the sample injection operation (from step 708) is started after sample information reading (step 705). As another form, in the case of electrophoresis preparation completion after sample information reading (step 705), the sample container 122 may be moved to the capillary position as it is (step 711) and the sample may be injected (step 712) without performing steps 706 to 710.

When the sample container has been replaced as in step 701 described above, it is necessary to read the sample information in order to identify the replaced sample container and determine the order of the subsequent electrophoresis processing. In the related art, sample information reading was performed outside the device before sample container mounting on the device or information on every device-mounted sample container was read. In contrast, in the method of the present embodiment, a sample information reading function such as the barcode reader 128 is incorporated in the electrophoresis device 101 and information is read only on the replaced sample container. In addition, by using the autosampler, the sample container 122 can be picked up from the storage portion 126 and transported to the reading position of the barcode reader 128 to read the sample information. Accordingly, information on the accommodated sample can be read immediately after the sample container 122 is put in, and thus the entire processing time can be shortened.

However, in the case of a single autosampler (drive system), it is imperative to return the buffer container 129 onto the storage portion 126 before transporting the sample container 122 and, after transporting the sample container 122, it is necessary to replace it with the buffer container 129 and transport it to the capillary position. Repeated autosampler transport occurs between the capillary position and the storage portion 126, and processing time is required. In addition, since an autosampler is used to transport the sample container 122, the cathode end of the capillary array 108 is continuously exposed to air during the transport of the sample container 122, which may lead to deterioration in analysis performance.

In this regard, by using the two drive systems of the sample autosampler 123 and the buffer autosampler 124, the processing time can be further shortened and deterioration in analysis performance can be prevented.

Figure 9:
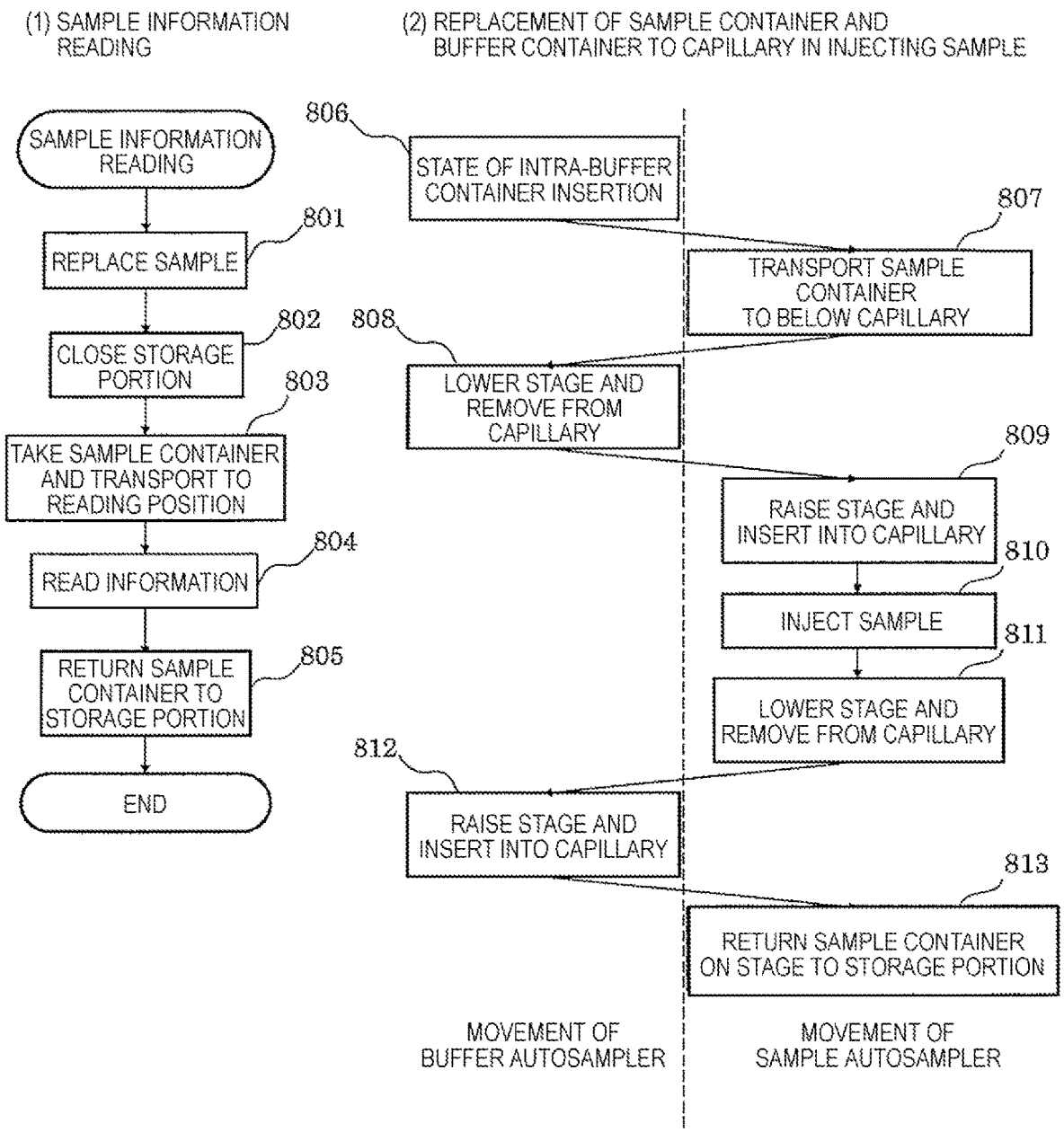
FIG. 9 is a flowchart illustrating a sample container and buffer container transport operation by the sample autosampler and a buffer autosampler.

FIG. 9 is a flowchart illustrating the transport operation of the sample container 122 and the buffer container 129 by the sample autosampler 123 and the buffer autosampler 124. The left drawing of FIG. 9 (steps 801 to 805) illustrates the operation in reading the sample information.

(Step 801)

The user replaces the sample container 122 in the storage portion 126.

(Step 802)

The user closes the storage portion 126 after disposing the sample container 122 in the storage portion 126. At this time, the reflective photointerrupter 132 of the storage portion 126 detects that the sample container 122 has been disposed and outputs a detection signal to the control unit 160.

(Step 803)

The control unit 160 identifies the disposition place where the sample container 122 is disposed from the detection signal of the reflective photointerrupter 132 and reads information on the sample container 122 at the disposition place. Specifically, the control unit 160 drives the sample autosampler 123 to place the sample container 122 at the above disposition place on the moving stage and transport it to the reading position of the barcode reader 128.

(Step 804)

The control unit 160 receives the read signal from the barcode reader 128 and reads the sample information.

(Step 805)

The control unit 160 drives the sample autosampler 123 to return it from the reading position of the barcode reader 128 to the storage portion 126.

The right drawing of FIG. 9 (steps 806 to 813) illustrates the operation in injecting the sample.

(Step 806)

In this step, the buffer container 129 on the buffer autosampler 124 is at the capillary position, and the cathode end of the capillary array 108 is inserted into the buffer container 129.

(Step 807)

The control unit 160 drives the sample autosampler 123 to place the sample container 122 at the above disposition place on the moving stage and transport it to the reading position of the barcode reader 128. The control unit 160 receives the read signal from the barcode reader 128 and reads the sample information. This sample information is read in order to confirm that it is the same as the sample information read in step 804, that is, the sample is error-free. Next, the control unit 160 drives the sample autosampler 123 to transport the sample container 122 to the standby position directly below the capillary position.

(Step 808)

The control unit 160 drives the buffer autosampler 124 to remove the capillary array 108 by withdrawing the buffer container 129 from the capillary position.

(Step 809)

The control unit 160 drives the sample autosampler 123 to transport the sample container 122 from the standby position to the capillary position.

(Step 810)

The control unit 160 drives the high-voltage power supply 110 to inject the sample into the capillary array 108 by voltage application between the cathode electrode 107 and the anode electrode 121.

(Step 811)

The control unit 160 drives the sample autosampler 123 to transport the sample container 122 from the capillary position to the standby position.

(Step 812)

The control unit 160 drives the buffer autosampler 124 to transport the buffer container 129 to the capillary position again.

(Step 813)

The control unit 160 drives the sample autosampler 123 to return the sample container 122 at the standby position to the storage portion 126.

As for the interlock mechanism 1263 of the storage portion 126, unlocking during the driving of the sample autosampler 123 or the processing may lead to the user putting his or her hand into and damaging the drive unit. Accordingly, the control unit 160 locks the interlock mechanism 1263 such that the storage portion 126 cannot be opened when the sample autosampler 123 is not at a predetermined position and unlocks it otherwise.

Figure 10:
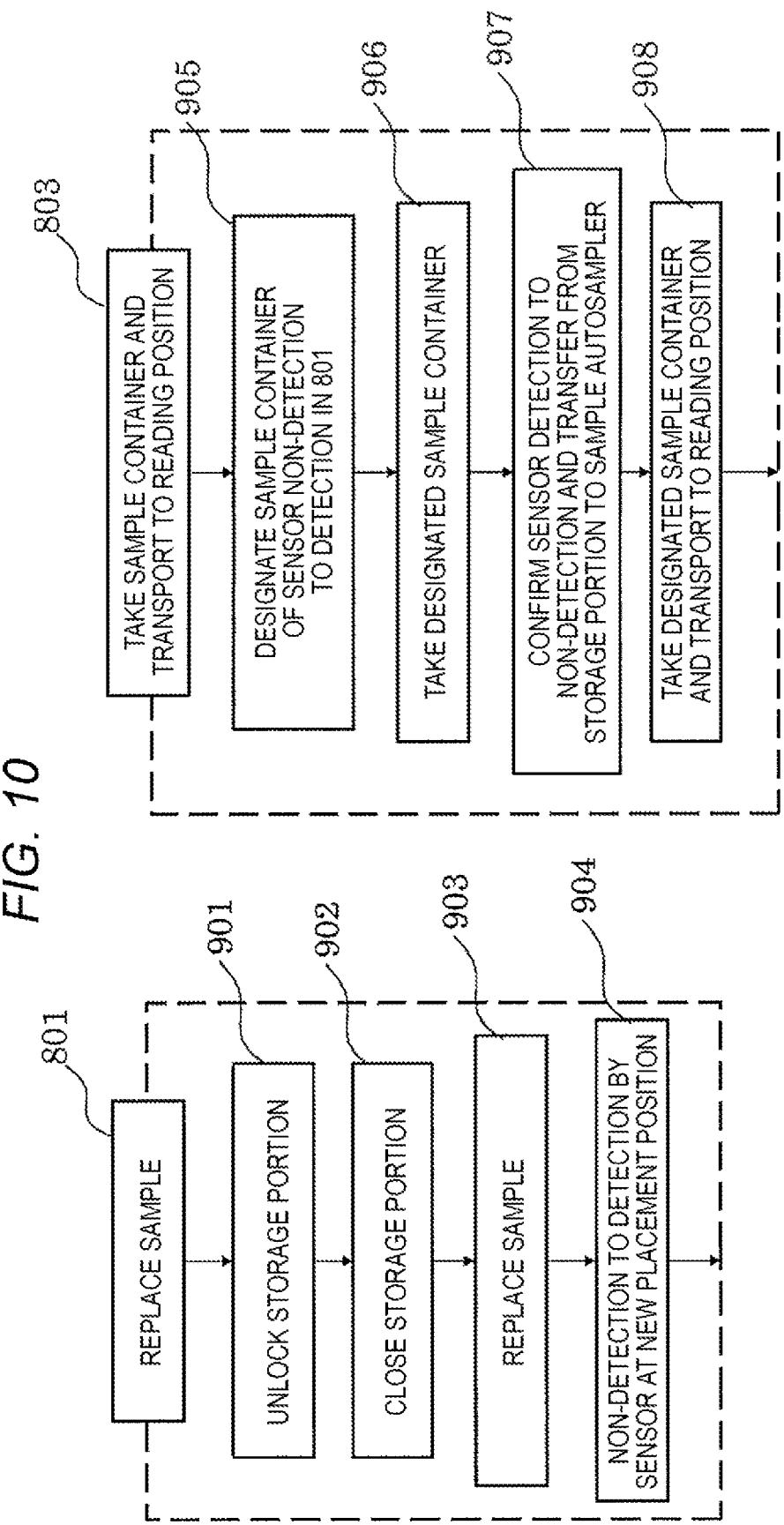
FIG. 10 is a flowchart illustrating an operation during sample information reading.

FIG. 10 is a flowchart illustrating the operation of the interlock mechanism 1263 and the reflective photointerrupter 132 in reading the sample information (steps 801 to 805).

The storage portion 126 is locked during the sample replacement in step 801, and thus the control unit 160 unlocks the interlock mechanism 1263 in step 901. In step 902, the user opens the storage portion 126. In step 903, the user disposes the sample container 122 at a predetermined disposition place. At this time, the sample container 122 is not at the predetermined disposition place. Accordingly, the reflective photointerrupter 132 does not detect the sample container 122 in step 904 and the reflective photointerrupter 132 detects the sample container 122 after the disposition.

The user closes the storage portion 126 in step 802 after disposing the sample container 122. Next, in step 803, the sample autosampler 123 takes the sample container 122 from the storage portion 126 and transports it to the reading position. At this time, the disposition place of non-detection-to-detection state transition of the reflective photointerrupter 132 with the sample container 122 disposed is designated in step 905 and the sample autosampler 123 takes the sample container 122 at the designated disposition place in step 906. In step 907, the control unit 160 confirms the detection-to-non-detection state transition of the reflective photointerrupter 132 with the sample container 122 placed on the sample autosampler 123. In step 908, the control unit 160 causes the sample autosampler 123 to transport the sample container 122 to the reading position. After that, steps 804 and 805 described above are executed.

<Summary>

As described above, the electrophoresis device 101 of the first embodiment incorporates a sample information reading device such as the barcode reader 128 and the storage portion 126 storing the sample container 122. At the disposition place of the sample container 122 in the storage portion 126, the presence or absence of the sample container 122 is detected by a sensor such as the reflective photointerrupter 132 and sample information is read only on the replaced sample container 122. As a result, it is not necessary to read sample information on every sample container 122 in the storage portion 126 and simply the sample container 122 that requires information reading can be processed. Accordingly, the processing time of the electrophoresis device 101 can be reduced. Further, the time of a user being bound by the operation of the electrophoresis device 101 can be shortened.

In addition, in the electrophoresis device 101 of the first embodiment, the sample container is transported from the storage portion to the standby position while the buffer container is disposed at the capillary position by the autosampler mechanism 105, and the sample container is transported from the standby position to the capillary position when the buffer container is transported from the capillary position to the standby position. In this manner, waiting at the standby position near the capillary position is caused before the sample container 122 is transported to the capillary position and the capillary array 108 is inserted, and thus the time of the cathode end of the capillary array 108 being exposed to air can be shortened. As a result, deterioration in analysis performance is prevented.

Further, by dividing the autosampler transporting the sample container 122 and the buffer container 129 into two for sample container transport and reagent container transport, the buffer container 129 does not have to be returned to the storage portion 126, and thus the processing time can be shortened. Although the buffer autosampler 124 during the electrophoresis transports the buffer container 129 to the capillary position and is fixed, the sample autosampler 123 can be driven freely, and thus the sample container 122 can be taken from the storage portion 126 and transported to the sample information reading position, and the sample information can be read.

Modification Example of First Embodiment

According to the method illustrated in FIG. 9, the sample autosampler 123 and the buffer autosampler 124 are driven independently. Alternatively, the sample autosampler 123 and the buffer autosampler 124 may be driven simultaneously for processing time shortening.

Figure 11:
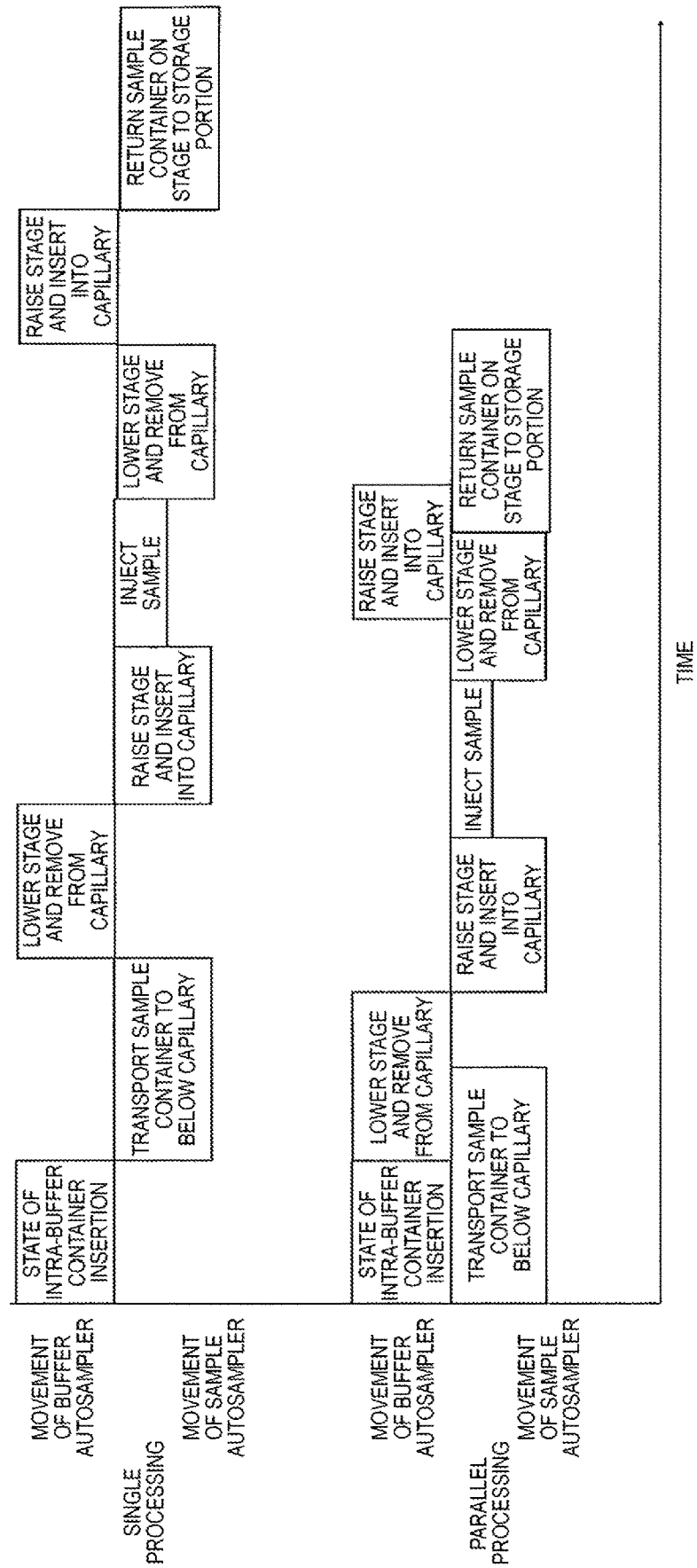
FIG. 11 is a timing chart illustrating a sample container and buffer container transport operation according to a modification example.

FIG. 11 is a timing chart illustrating the transport operation of the sample container 122 and the buffer container 129 according to a modification example. The upper part of FIG. 11 illustrates the operation of the sample autosampler 123 and the buffer autosampler 124 in the right drawing of FIG. 9 (steps 806 to 813), and the lower part of FIG. 11 illustrates the operation in this modification example. As illustrated in FIG. 11, the sample autosampler 123 and the buffer autosampler 124 in this modification example are simultaneously driven in some operations whereas the sample autosampler 123 and the buffer autosampler 124 in FIG. 9 are driven alternately. It can be seen that the processing time is shortened as a result.

Second Embodiment

According to the example described in the first embodiment, the sample autosampler 123 transports the sample container 122 and the buffer autosampler 124 transports the buffer container 129. In contrast, the second embodiment proposes a single-autosampler configuration in which fixing units capable of fixing the sample container 122 and the buffer container 129 are provided at standby positions near a capillary position.

Configuration Example of Electrophoresis Device

Figure 12:
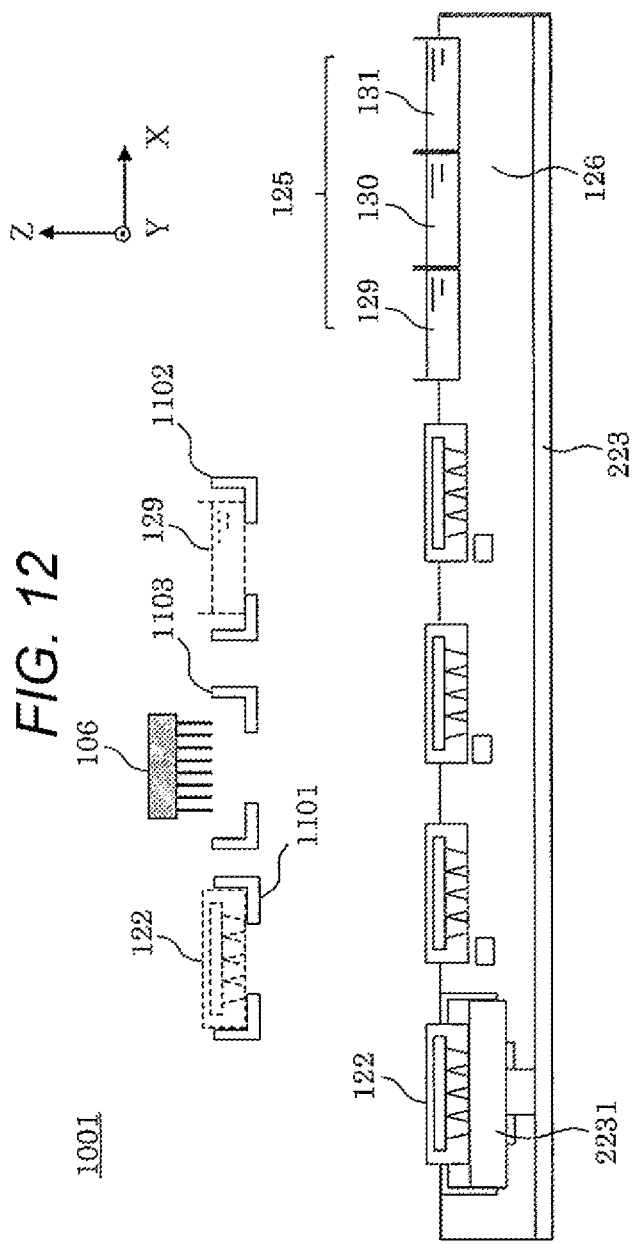
FIG. 12 is a schematic diagram illustrating the configuration of a part of an electrophoresis device according to a second embodiment.

FIG. 12 is a schematic diagram illustrating the configuration of a part of an electrophoresis device 1001 according to the second embodiment. The electrophoresis device 1001 of the present embodiment has fixing units 1101 to 1103 and one autosampler 223. The other configurations are the same as those of the electrophoresis device 101 of the first embodiment and thus will not be described.

The fixing unit 1103 (first fixing unit) is disposed directly below the load header 106, that is, at the capillary position. The fixing units 1101 and 1102 (second fixing units) are disposed at positions adjacent to the fixing unit 1103, that is, at the standby positions near the capillary position. Each of the fixing units 1101 to 1103 has a structure in which members L-shaped in cross section face each other and can be opened and closed by the L-shaped members moving in the horizontal direction. The opening-closing operations of the fixing units 1101 to 1103 are controlled by the control unit 160.

The autosampler 223 is provided with a moving stage 2231 and transports the sample container 122 and the reagent container 125 from the storage portion 126 to the fixing unit 1103 at the capillary position and the fixing units 1101 and 1102 near the capillary position. For example, the sample container 122 is transported to the fixing unit 1101 and the reagent container 125 is transported to the fixing unit 1102.

The storage portion 126 is disposed below the fixing units 1101 to 1103. The sample container 122 and the reagent container 125 are stored in the storage portion 126.

<Operation of Autosampler>

Figure 13:
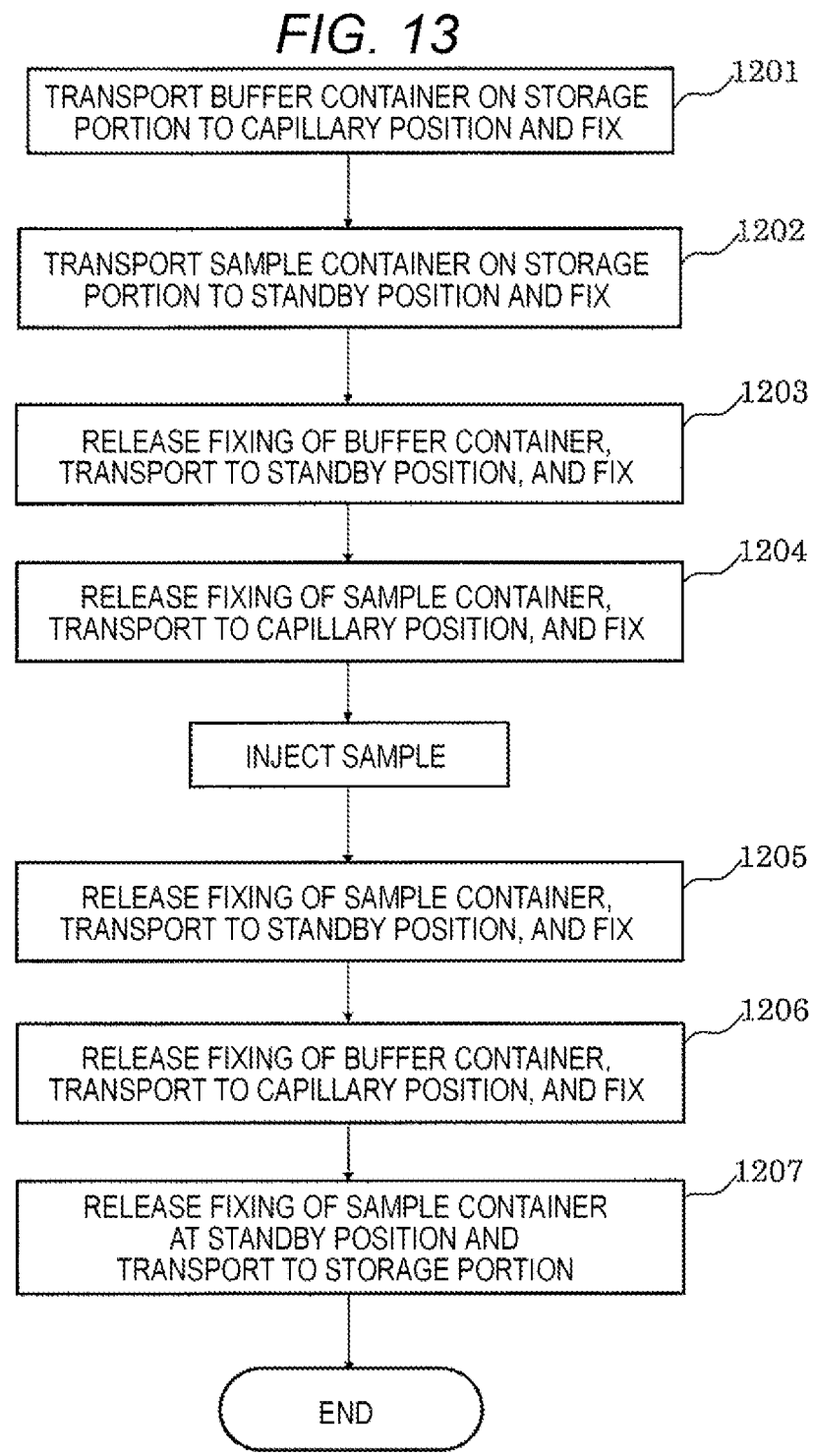
FIG. 13 is a flowchart illustrating a sample container and buffer container transport operation in the second embodiment.

FIG. 13 is a flowchart illustrating the transport operation of the sample container 122 and the buffer container 129 in the second embodiment. It should be noted that a series of overall operations in the electrophoresis device are the same as in the first embodiment (FIGS. 6 and 7).

(Step 1201)

The control unit 160 drives the autosampler 223 and the fixing unit 1103 to transport the buffer container 129 from the storage portion 126 to the fixing unit 1103 at the capillary position and fix it.

(Step 1202)

The control unit 160 drives the autosampler 223 and the fixing unit 1101 to transport the sample container 122 from the storage portion 126 to the fixing unit 1101 and fix it.

(Step 1203)

The control unit 160 drives the pump mechanism 104 to fill the capillary with a polymer. After that, the control unit 160 drives the fixing unit 1103 to release the fixing of the buffer container 129 and drives the autosampler 223 and the fixing unit 1102 to transport the buffer container 129 from the fixing unit 1103 to the fixing unit 1102 and fix it.

(Step 1204)

The control unit 160 drives the autosampler 223 and the fixing unit 1101 to release the fixing of the sample container 122 and drives the autosampler 223 and the fixing unit 1103 to transport the sample container 122 from the fixing unit 1101 to the fixing unit 1103 and fix it. After that, the control unit 160 drives the high-voltage power supply 110 to inject a sample into the capillary array 108 by voltage application between the cathode electrode 107 and the anode electrode 121.

(Step 1205)

The control unit 160 drives the autosampler 223 and the fixing unit 1103 to release the fixing of the sample container 122 and drives the autosampler 223 and the fixing unit 1101 to transport the sample container 122 from the fixing unit 1103 to the fixing unit 1101 and fix it.

(Step 1206)

The control unit 160 drives the autosampler 223 and the fixing unit 1102 to release the fixing of the buffer container 129 and drives the autosampler 223 and the fixing unit 1103 to transport the buffer container 129 from the fixing unit 1102 to the fixing unit 1103 and fix it. After that, the control unit 160 drives the high-voltage power supply 110 to perform electrophoresis by voltage application between the cathode electrode 107 and the anode electrode 121.

(Step 1207)

During the electrophoresis, the control unit 160 drives the autosampler 223 and the fixing unit 1101 to release the fixing of the sample container 122 and causes the autosampler 223 to return the sample container 122 onto the storage portion 126.

In the present embodiment, the energization path can be filled with the polymer and sample information can be read between, for example, steps 1201 and 1202.

<Summary>

As described above, the electrophoresis device 1001 of the second embodiment is provided with one autosampler 223 and the fixing units 1101 to 1103 capable of placing and fixing the sample container 122 and the buffer container 129 at and near the capillary position. The autosampler 223 transports the buffer container 129 between the fixing unit 1103 (capillary position) and the fixing unit 1102 (standby position) and transports the sample container 122 between the storage portion 126, the fixing unit 1101 (standby position), and the fixing unit 1103 (capillary position).

As a result, the transport distances of the sample container 122 and the buffer container 129 decrease, there is no need to return the containers to the storage portion 126 each time, and thus deterioration in electrophoresis performance can be suppressed. In a case where one autosampler is provided and the fixing units 1101 to 1103 are not provided, the autosampler is used in order to hold the buffer container 129 at the capillary position during electrophoresis, and thus no sample container reading operation can be performed. In contrast, in the present embodiment, the buffer container 129 is fixed by the fixing unit 1103 during electrophoresis, and thus it is possible to read sample information during electrophoresis, as in the first embodiment, even with the single autosampler 223.

In addition, in the electrophoresis device 1001 of the second embodiment, the autosampler 223 transports the sample container 122 from the storage portion 126 to the fixing unit 1101 (standby position) while the buffer container 129 is disposed at the fixing unit 1103 (capillary position) and transports the sample container 122 from the fixing unit 1101 (standby position) to the fixing unit 1103 (capillary position) when the buffer container 129 is transported from the fixing unit 1103 (capillary position) to the fixing unit 1102 (standby position). By causing waiting at the standby position near the capillary position before the sample container 122 is transported to the capillary position and the capillary array 108 is inserted in this manner, the time of the cathode end of the capillary array 108 being exposed to air can be shortened. As a result, deterioration in analysis performance is prevented.

Modification Example

The present disclosure includes various modification examples without being limited to the above embodiments. For example, the above embodiments have been described in detail in order to describe the present disclosure in an easy-to-understand manner and do not necessarily include every described configuration. In addition, a part of one embodiment can be replaced with the configuration of the other embodiment. In addition, the configuration of the other embodiment can be added to the configuration of one embodiment. In addition, a part of the configuration of the other embodiment can be added, deleted, or replaced with respect to a part of the configuration of each embodiment.

REFERENCE SIGNS LIST

101: electrophoresis device
102: capillary electrophoresis portion
103: irradiation detection unit
104: pump mechanism
105: autosampler mechanism
106: load header
107: cathode electrode
108: capillary array 109: constant temperature bath
110: high-voltage power supply
111: capillary head
112: detection unit
113: light source
114: optical detector
115: block
116: pump
117: check valve
118: pin valve
119: polymer container
120: buffer container
121: anode electrode
122: sample container
123: sample autosampler
124: buffer autosampler
125: reagent container
126: storage portion
127: electric gripper
128: barcode reader
129: buffer container
130: washing tank
131: waste liquid tank
132: reflective photointerrupter
201: drive region of sample autosampler
202: drive region of buffer autosampler
301: stage
302: well
303: positioning pin
304: solenoid
305: spring
306: positioning hole

The invention claimed is:

1. An electrophoresis device comprising:
a capillary filled with a phoresis medium;
a buffer container accommodating a buffer solution;
a storage portion storing a sample container accommodating a sample;
a sample autosampler transporting the sample container;
a buffer autosampler transporting the buffer container; and
a computer configured to control driving of the autosampler,
wherein the computer is configured to:
control driving of the sample autosampler to transport the sample container between the storage portion, a standby position, and a capillary position, and to control driving of the buffer autosampler to transport the buffer container between the capillary position and the standby position,
control the sample autosampler to, while the buffer container is disposed at the capillary position where one end portion of the capillary is positioned, transport the sample container from the storage portion to the standby position near the capillary position, and
control the sample autosampler and buffer autosampler to, when the buffer container has been transported from the capillary position to the standby position, transport the sample container from the standby position to the capillary position.

2. The electrophoresis device according to claim 1,
wherein the computer is configured to:
control the sample autosampler to start the transport of the sample container after the capillary is filled with the phoresis medium, and
control the sample autosampler to withdraw the sample container from the capillary position after the sample container is transported to the capillary position and the sample is injected into the capillary and before electrophoresis is started.

3. The electrophoresis device according to claim 1,
wherein the sample autosampler is driven within a first region of movement and the buffer autosampler is driven within a second region of movement, which is different than the first region of movement except for the capillary position where the first region of movement and the second region of moment overlap.

4. The electrophoresis device according to claim 1,
wherein the control unit locks the storage portion when the sample autosampler is not at a predetermined position and unlocks the storage portion when the sample autosampler is at the predetermined position.

5. The electrophoresis device according to claim 1, further comprising:
a barcode reader,
wherein information on the sample is marked on the sample container, and
wherein the computer is configured to drive the sample autosampler so as to transport the sample container from the storage portion to a reading position of the barcode reader.

6. The electrophoresis device according to claim 5,
wherein the storage portion has a sensor detecting presence or absence of the sample container, and
wherein when the sensor detects that the sample container has been disposed, the computer is configured to drive the sample autosampler to transport the sample container from the storage portion to the reading position, and read the information on the sample based on a read signal of the barcode reader.

7. The electrophoresis device according to claim 6,
wherein the storage portion includes a plurality of storage positions,
wherein the sensor is provided at each of the plurality of storage positions, and
wherein the computer is configured to drive the sample autosampler to transport the sample container to the reading position from the storage position where the sensor has detected that the sample container has been disposed.

8. The electrophoresis device according to claim 1,
wherein the computer is configured to simultaneously drive the sample autosampler and the buffer autosampler at a predetermined timing.

9. An electrophoresis device comprising:
a capillary filled with a phoresis medium;
a buffer container accommodating a buffer;
a storage portion storing a sample container accommodating a sample;
a sample autosampler transporting the sample container;
a buffer autosampler transporting the buffer container;
a barcode reader configured to read information on the sample marked on the sample container; and
a computer configured to control the sample autosampler and buffer autosampler,
wherein the computer is configured to:
drive the sample autosampler to transport the sample container from the storage portion to a reading position of the barcode reader
drive the buffer autosampler to transport the buffer container between the capillary position where one end portion of the capillary is positioned and the standby position near the capillary position, and drive the sample autosampler to transport the sample container between the storage portion, the standby position, and the capillary position.

10. The electrophoresis device according to claim 9,
wherein the storage portion has a sensor detecting presence or absence of the sample container, and
wherein the computer is configured to, when the sensor detects that the sample container has been disposed, drive the sample autosampler to transport the sample container from the storage portion to the reading position, and read the information on the sample based on a read signal of the barcode reader.

11. The electrophoresis device according to claim 10,
wherein the storage portion includes a plurality of storage positions,
wherein the sensor is provided at each of the plurality of storage positions, and
wherein the computer is configured to drive the sample autosampler to transport the sample container to the reading position from a storage position, among the plurality of storage positions, where the sensor has detected that the sample container has been disposed.

12. The electrophoresis device according to claim 9, further comprising:
a buffer autosampler configured to transport a buffer container accommodating a buffer.

* * * * *